Dec. 14, 1948.         W. H. FURNESS         2,456,120
THREAD ADVANCING REEL
Filed Feb. 19, 1945                         7 Sheets-Sheet 1
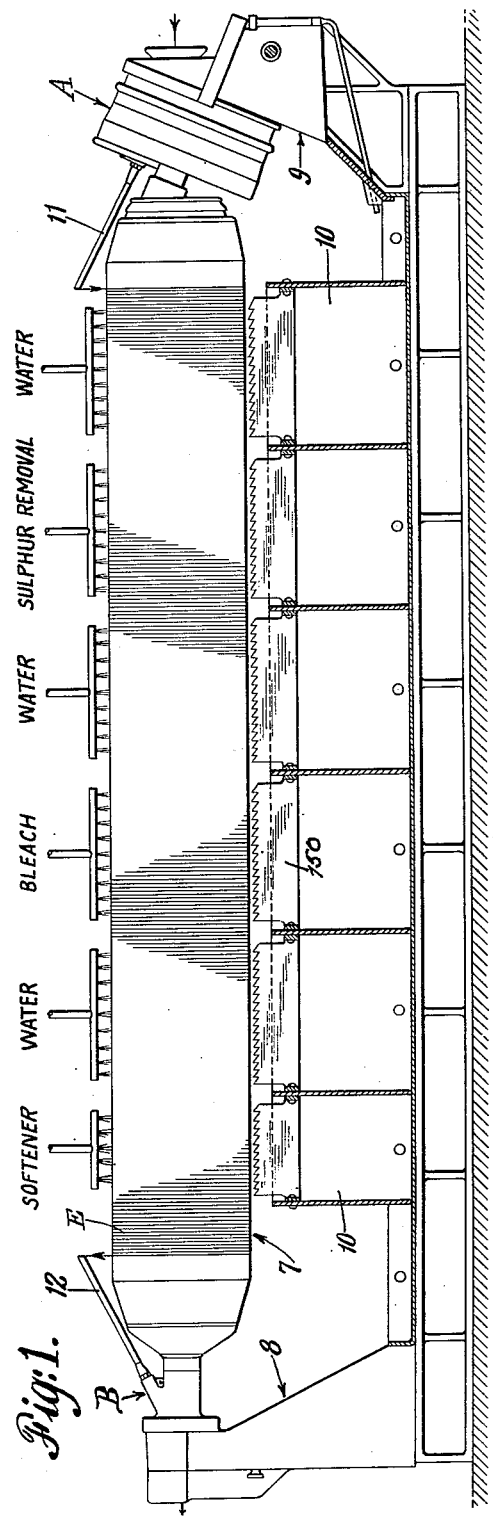
Fig. 1.
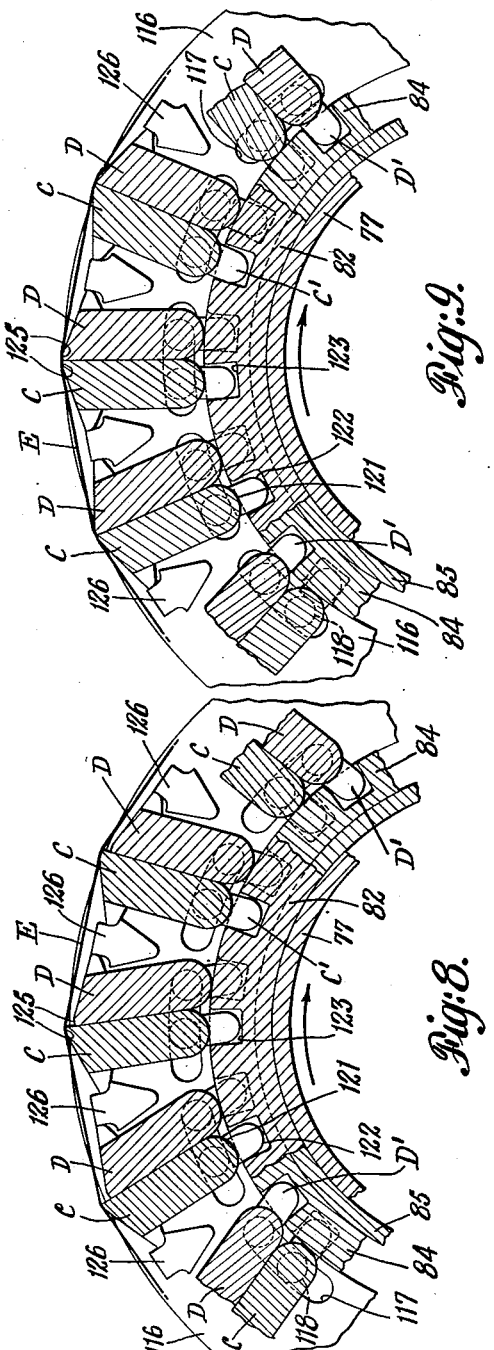
Fig. 8.
Fig. 9.
INVENTOR
Wm. H. Furness
BY
ATTORNEYS Dec. 14, 1948.  W. H. FURNESS  2,456,120
THREAD ADVANCING REEL
Filed Feb. 19, 1945  7 Sheets-Sheet 2
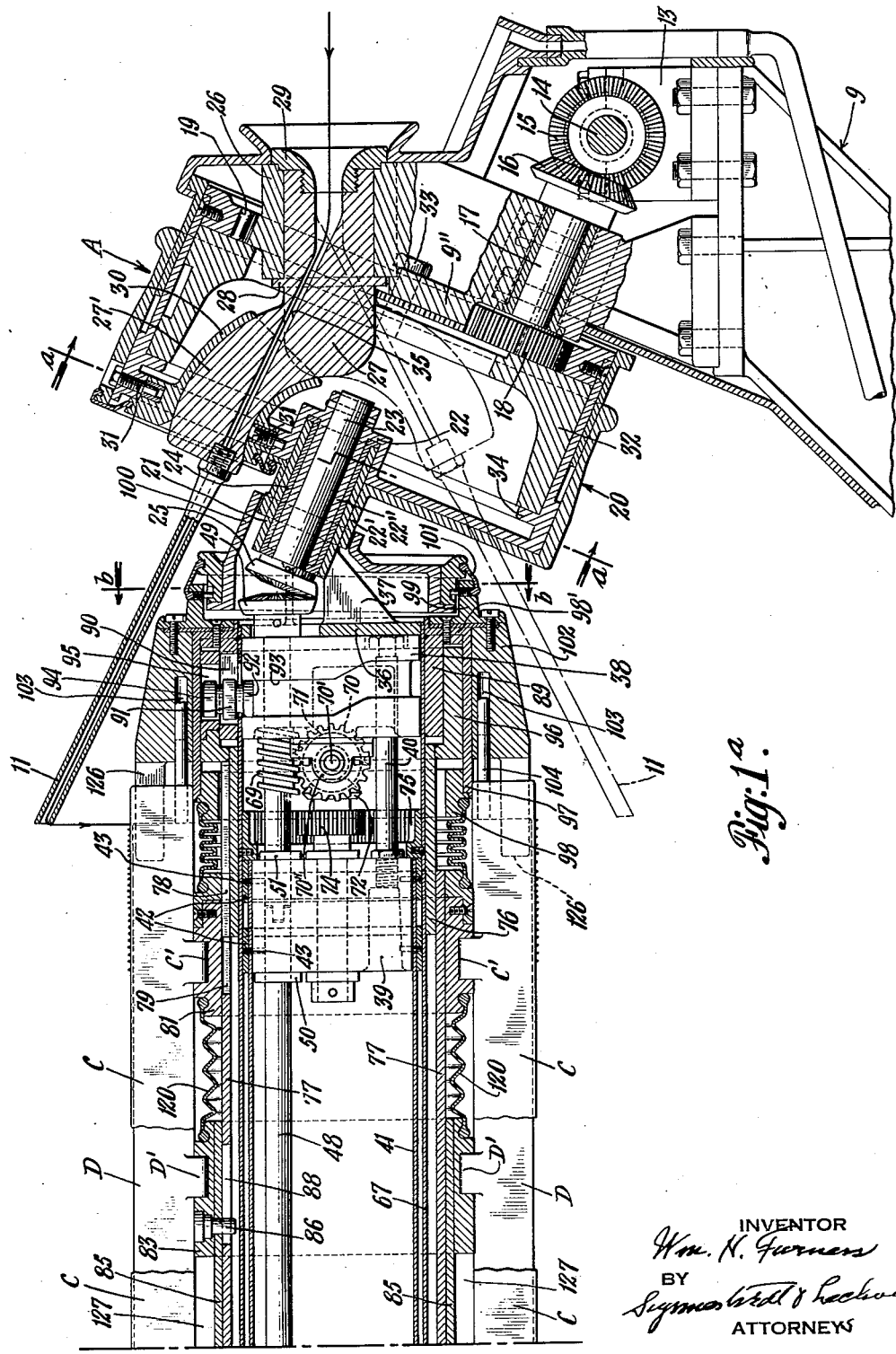
Fig.1ᵃ.
INVENTOR
Wm. H. Furness
BY
ATTORNEYS

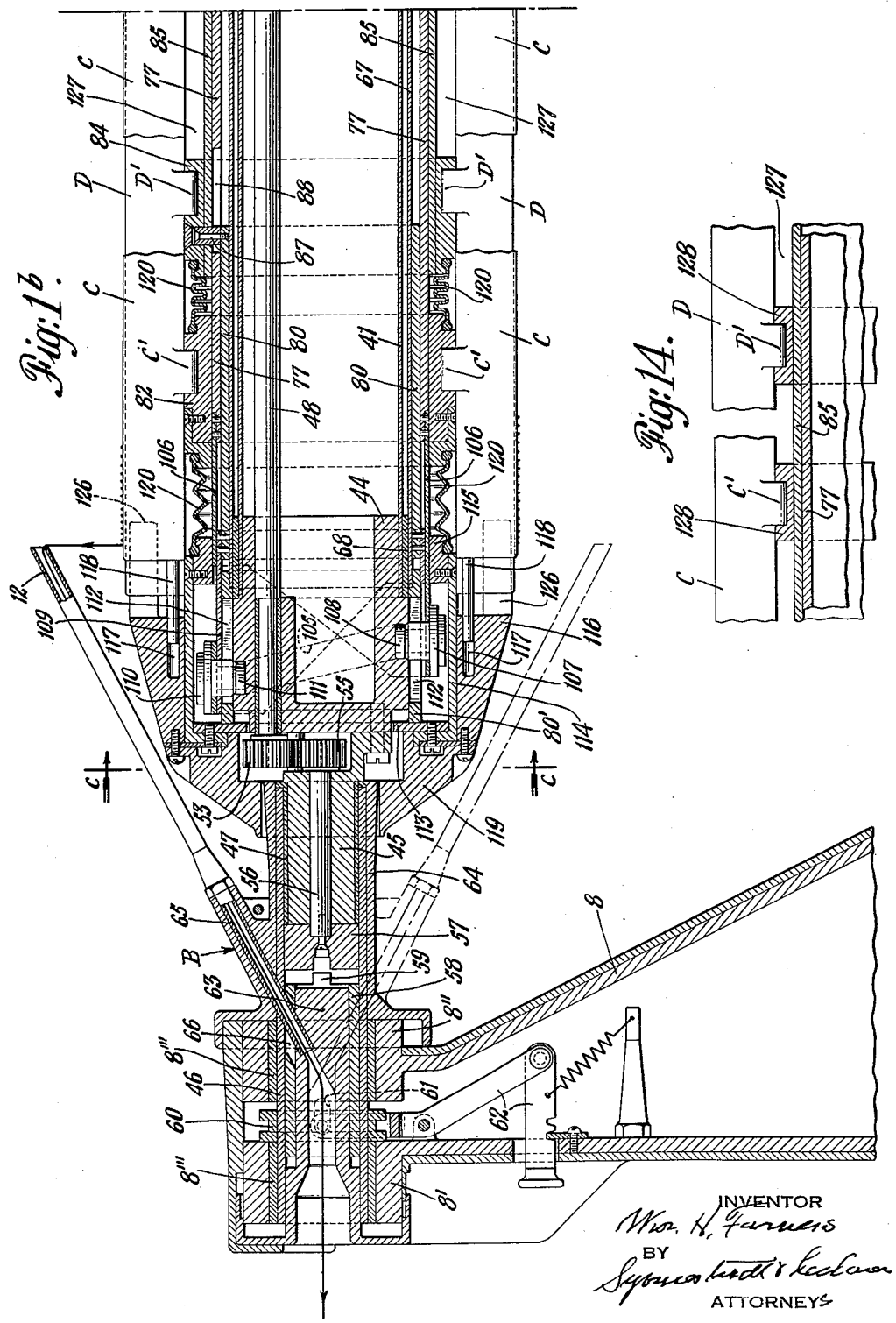

Dec. 14, 1948. W. H. FURNESS 2,456,120
THREAD ADVANCING REEL
Filed Feb. 19, 1945 7 Sheets-Sheet 4

INVENTOR
Wm. H. Furness
BY
ATTORNEYS

Dec. 14, 1948.  W. H. FURNESS  2,456,120
THREAD ADVANCING REEL
Filed Feb. 19, 1945  7 Sheets-Sheet 5
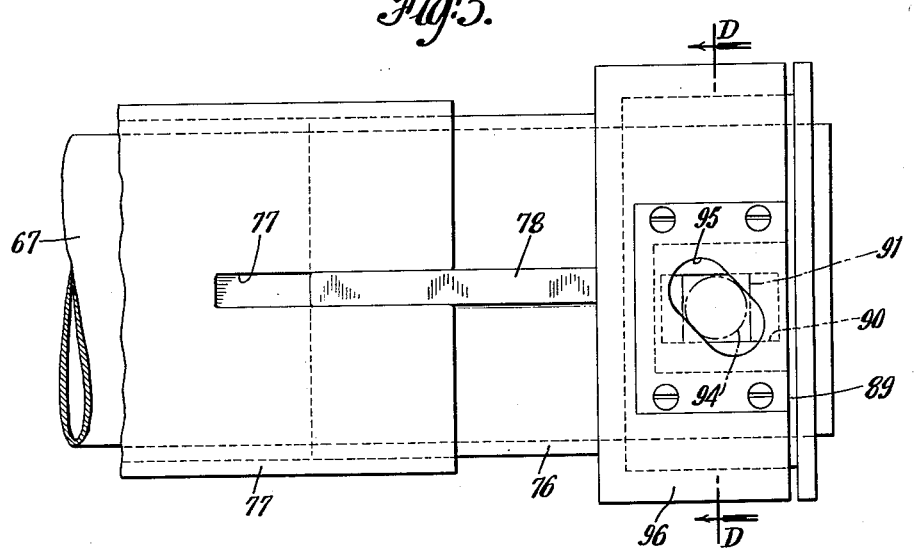
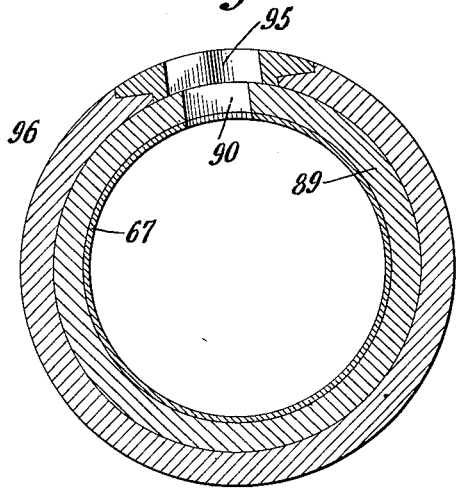
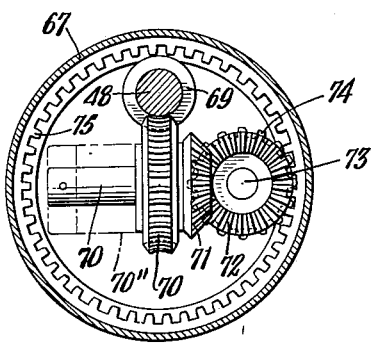
INVENTOR
Wm. H. Furness
BY
ATTORNEYS Dec. 14, 1948.   W. H. FURNESS   2,456,120
THREAD ADVANCING REEL
Filed Feb. 19, 1945   7 Sheets-Sheet 6

INVENTOR
Wm. H. Furness
BY
ATTORNEYS

Dec. 14, 1948. W. H. FURNESS 2,456,120
THREAD ADVANCING REEL
Filed Feb. 19, 1945 7 Sheets-Sheet 7

INVENTOR.
William H Furness
BY
ATTORNEYS.

Patented Dec. 14, 1948

2,456,120

UNITED STATES PATENT OFFICE 2,456,120

THREAD ADVANCING REEL

William H. Furness, Haddonfield, N. J., assignor to American Viscose Corporation, Wilmington, Del., a corporation of Delaware Application February 19, 1945, Serial No. 578,599

32 Claims. (Cl. 28—71.6)

This invention relates to reels useful for the production of rayon by the so-called continuous method, in which the yarn, as spun, is laid up on the reel (or reels) in the form of a helix and subjected to a succession of various treatments. Its nature and advantages will appear from the following.

The general advantages of the continuous process as against the discontinuous processes as so largely currently used, have long been recognized in the art, and moreover it has been long known to provide reels in the yarn making and yarn treating arts upon which the yarn has been laid up in the form of a helix, for treatment purposes.

One type of such known reel is well exemplified in the United States patent to Boos, No. 1,052,125 of February 4, 1913, in which two sets of concentric bars are employed.

There is another type of reel exemplified in the United States patent to Heilman No. 34,494, issued February 25, 1862 in which the two sets of bars, instead of being mounted concentrically, are mounted eccentrically with respect to one another, so as to avoid bodily moving bars radially in and out.

The reel of the present invention is of the concentric type, but because, among other things, of a new principle of operating and supporting the bars, the reel has certain advantages to be hereinafter pointed out.

The construction of the reel of my invention is such that it can be used, in suitable sizes, for the commercial production of yarns, whether of the viscose, cuproammonium or similar type, of any denier from the finest up to very heavy tow, say, for example, tow of 60,000 denier or even greater, in a simple and economical manner.

Moreover, the construction and operation of my reel are such as to make it possible to perform all of the treatment operations required in the production of either viscose, cuproammonium or similar yarns, or as many of such treatment operations as is desired, on a single reel, the treatment liquids being kept separate for separate collection.

How the foregoing, together with such other objects and advantages as may hereinafter appear, or are incident to my invention, are realized, is illustrated in the accompanying drawings, wherein—

Figure 1 is a diagrammatic side elevation and section of a reel embodying my invention;

Figure 1—a is an enlarged vertical cross section through the right-hand end of the reel of Figure 1, drawn on an enlarged scale;

Figure 1—b is a similar cross-sectional view of the left-hand end of the reel of Figure 1;

Figure 5 is a plan view of certain cam operating mechanism employed at the right hand end of the reel proper, drawn on an enlarged scale;

Figure 6 is a section taken on the line D—D of Figure 5;

Figure 7 is a sectional view illustrating certain details of the reel driving mechanism, drawn on an enlarged scale;

Figures 8 and 9 are fragmentary cross sectional views drawn on an enlarged scale and illustrating two positions of the bars of the reel;

Figure 14 illustrates a detail of the invention; and

Figure 2:
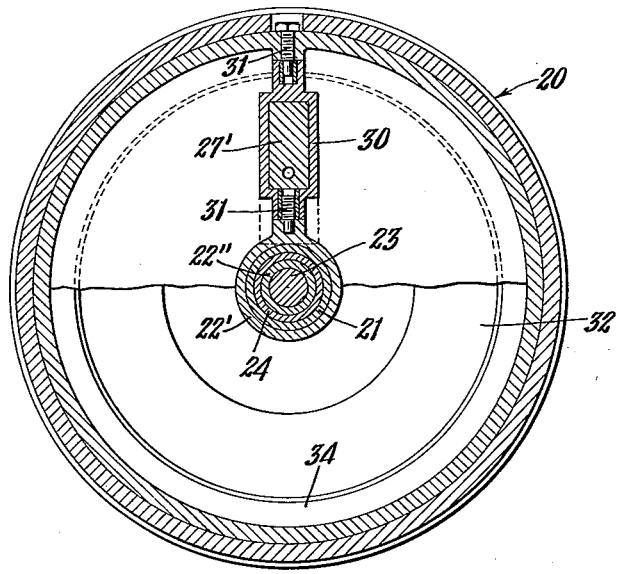
Figure 2 is a section taken on the line A—A of Figure 1—a.
Figure 3:
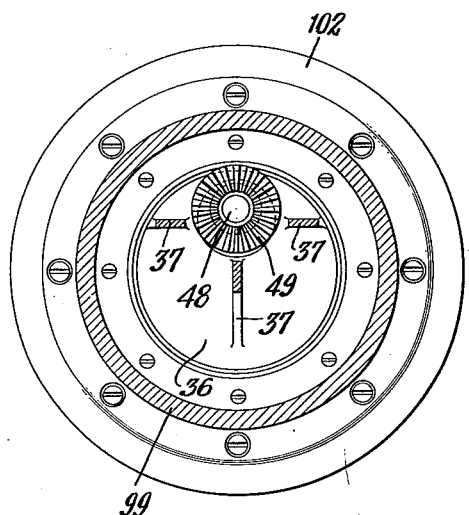
Figure 3 is a section taken on the line B—B of Figure 1—a.

My invention will be described as applied to the production of long filament, viscose yarn of customary denier.

Referring now to Figure 1, the reel is indicated as a whole by the reference numeral 7, and it is supported, desirably but not necessarily rotatably, in a horizontal position by the supporting structure at the left hand end, generally indicated by the reference numeral 8, and by the supporting structure at the right hand end, generally indicated by the reference numeral 9. How the reel may be rotated, and how the yarn is caused to travel therealong in the form of a helix, will further appear.

Immediately above the reel, treatment liquids are applied at a plurality of longitudinally spaced points. Immediately below are the collecting troughs, generally indicated by the reference numeral 10, which serve to separately collect the several treatment liquids for recovery operations.

The manner in which the liquid is applied to the reel to prevent co-mingling and to allow for separate collection will be later described.

Briefly stated, the operations, when producing viscose yarn of customary deniers, are as follows, reference being had to Figures 1, 1—a and 1—b:

The freshly spun rayon is led through the whirler or whorl tube 11 of a whirler device indicated as a whole by the reference letter A and which will be later described. The whirler device is rotated and lays the freshly spun yarn around the bars or slats C and D of the reel. The bars of the reel operate, as will further appear, to advance the turns of yarn laid on by the whirler tube, toward the left, in consequence of which the yarn is laid up on the reel in the form of a helix, which advances along the reel to the left hand end thereof, at which point the free end of the yarn is led through a corresponding whirler tube 12 of the whirler device indicated as a whole by the reference letter B. The whirler tube 12 rotates in the same direction as does the whirler tube 11 and at the same speed, and removes the yarn, turn for turn, as laid on by the whirler tube 11. The helix of yarn on the reel is successively subjected to the various liquid treatments diagrammatically indicated in Figure 1. The pitch of the helix is determined by the longitudinal reciprocating stroke of the bars of the reel and the relative speed of the whirler.

Insofar as advancing the yarn in the form of a helix along the cage is concerned, it is unnecessary in this design to have the reel rotate. To secure a more uniform and effective application of the various treatment liquids to all of the yarn on the reel, it is desirable to slowly rotate the reel. This rotation may be in the same direction of rotation as that of the whirler tube 11, or the reel may be rotated in a reverse direction. When the wheel is rotated in the same direction as that of the whirler tube 11, the reel is rotated relatively very slowly in order that the yarn may be rapidly laid on the reel. (If the reel and the whirler tube rotated at the same speed, in the same direction, no yarn would be laid on the reel.) Furthermore, it is desirable to rotate the reel slowly in order to make it possible to effectively separately collect the various treatment liquids. For example, if the reel was rotated at very high speed, centrifugal force would not only spread the liquids longitudinally but also throw off the liquids, and it is impossible to avoid commingling and to separately collect the same. The reel is preferably rotated opposite to the wind and so slowly as to present no objectionable resistance to the natural dripping off of the liquids due to the action of gravity. To illustrate, if the reel be exactly horizontal and were not turned at all, each liquid applied at the top of the reel would drop off the bottom of the reel, directly below the region of application. The reel should be rotated at a speed such as not objectionably to interfere with this operation. This slow rotation of the horizontally disposed reel, however, will ensure a uniform and effective application of the treatment liquids to the yarn. The liquids are applied to one side of the longitudinal axis, preferably on the upwardly moving side of the reel, in consequence of which there will be a layer of liquid built up on the upwardly moving side of the reel, from the bottom of the reel partway up. Notwithstanding, the liquid will drip off the bottom. Toothed scraper plates 150 are located in the troughs, with their upper edges spaced away from the turns of yarn so as not to contact therewith but close enough to contact with drops of liquid forming on the bottom of the reel, say $\frac{1}{8}''$ from the turns. This will remove the drops before they have opportunity to run together to form larger bodies, which might run to an adjacent area or section.

By reason of the foregoing, and of the fact that there is a substantial gap between the regions of application of the various liquids, as will be seen on inspection of Figure 1, the individual treatment liquids will not undesirably commingle while on the reel, but will drop off separately for a separate collection in the respective troughs located directly below the means for applying the respective liquids, for separate recovery.

In the reel shown, the whirler 11 is rotated at about 150 R. P. M., winding approximately 100 meters per minute, and, by means of reduction gearing, the reel rotates at 3 R. P. M. in the opposite direction. This I have found to give satisfactory results.

The mechanism will now be described in detail.

Referring now to the right-hand supporting structure indicated as a whole by the reference numeral 9, this is provided with bearings 13 for a power shaft 14. The power shaft is provided with a bevel gear 15 meshing with a similar gear 16 on the lay shaft 17 which also has bearings carried by the supporting structure. Shaft 17 has keyed thereto a gear wheel 18 which meshes with the internal ring gear 19 carried by the whirler head indicated as a whole by the reference numeral 20. By these driving connections the whirler head is rotated about its axis. (It is to be understood that there is suitable clutch mechanism not shown for coupling bevel gear 15 to the power shaft.)

The axis of rotation of the whirler head is provided by the ring-like bearing member 32, which is supported from the bracket 9'' of the supporting structure 9 through the medium of studs 33. This bearing member 32 fits within the inner member of the head 20. The inner member of the whirler head has an inner annular lip 34 adapted to bear against the outer face of the bearing member 32 for positioning purposes.

It will be seen that the axis of rotation of the whirler head is inclined from the horizontal.

The manner in which the whirler tube 11 is supported and rotated by the whirler head will now be described.

The bracket 9'' carries a sleeve 26, the axis of which coincides with the longitudinal axis of the reel. Rotatably supported in the sleeve 26 is a shaft-like or axle member 27 which is positioned longitudinally with respect to the sleeve by means of the collar 28 and the nut-like member 29 adapted to thread into the shaft of axle member 27. At its left-hand end the shaft member 27 has an arcuate portion 27' somewhat in the nature of a gooseneck. This gooseneck fits into a correspondingly arcuate sleeve-like member 30 constituting a part of the whirler head and being secured thereto by means of the members 31 (see Fig. 2).

Thus, when the whirler head, and with it the sleeve, is rotated, the gooseneck 27' is caused to move with the sleeve, in turn causing the axle 27 to rotate about its axis. Notwithstanding the axis of axle 27 is horizontal and the axis of the whirler head is inclined from the horizontal, no binding occurs by reason of the fact that the gooseneck 27' and the sleeve 20 are arcuate with their radii struck from a center on the horizontal axis of shaft 27. As the head rotates, sleeve 30 moves in and out relative to gooseneck 27', the sleeve and the gooseneck occupying the relative positions shown in dotted lines when the whirler tube 11 is in the bottom. Thus, although the whirler tube is rotated by the head, the free end of the tube always moves in the same vertical plane.

The freshly spun yarn runs through the flared opening in nut 29, thence through the hole 35 in axle 27, and gooseneck 27', and into and through the whirler tube 11 which is threaded into gooseneck 27'. The free end of the yarn is laced through the parts by means of a wire with a hook on its end, when the reel is not operating. To lace the free end on the reel it is only necessary to throw it against the reel or to give it a turn or two by hand, or the like. (Whirler head B is not clutched in until the helix reaches the left hand end of the reel and the free end of the yarn has been laced through whirler tube 12 and associated parts.)

The whirler head is also used as the means for imparting rotating movement to the reel. To this end the head is provided with a double sleeve member 22, the outer sleeve 22' of which fits around the sleeve 21, which is carried by a part of the reel, as will later be described. The inner sleeve 22" is internal of the sleeve 21 and there is a bearing bushing 24 interposed between it and the sleeve 21. Keyed to the double sleeve member 22 in a shaft 23 carrying a bevel gear 25 at its left hand end. Thus, when the whirler head is rotated, shaft 23 and gear 25 are also rotated, thus bringing about rotation of reel parts to be described.

The manner in which sleeve 21 is supported from the reel will now be described. In the right hand end portion of the reel there is a plate 36 provided with three ribs 37 formed integrally therewith and integrally with the sleeve 21. Plate 36 constitutes a part of a cam block 38. Somewhat to the left, and within the reel, is another block 39 to which cam block 38 and plate 36 are secured by a plurality of studs or bolts 40. Secured to block 39 and extending to the left therefrom is a cylinder 41, having two bearing rings 42 on its outer periphery. The screws or studs 43 secure block 39, cylinder 41, and bearing rings 42 together.

Referring now to Figure 1—b and the left-hand end of cylinder 41, it will be seen that the left-hand end of the cylinder 41 is secured to a cam block 44 (as by welding) to the left-hand face of which is secured a cylindrical bearing member or support 45, the axis of which coincides with the axis of shaft 27 and with the longitudinal axis of the reel, supported as will now be described.

The supporting structure 8 has two pillow blocks 8' and 8", each provided with bearing bushings 8'". Mounted within and positioned by the bearing bushings 8'" is a sleeve 46 which extends to the right and has its right-hand end surrounding the bearing member 45. Interposed between the member 45 and the sleeve is a bearing bushing 47.

From the foregoing it will be seen that the inner cylinder 41 of the reel is supported at the right-hand end through the medium of blocks 39 and 38 and sleeve 21 and at the left-hand end by the block 44 and member 45, through the medium of sleeve 47, supported, as described, from the structure 8. Thus, cylinder 41, blocks 39 and 38, sleeve 21, block 44, and member 45 constitute what may be termed the framework of the reel proper, supported through the supporting structures 8 and 9. While the part 41 is shown as a cylinder, it need not necessarily be in such form, as any device suitable for connecting blocks 44 and 39 as a unit may be employed.

Mounted within the cylinder 41 and extending from the right through plate 36, block 38, and block 39, and to the left through block 44, is the reel driving shaft 48, adapted to bring about the rotation of the rotating parts of the reel proper. The shaft has suitable bearings in blocks 36, 39 and 44 and is longitudinally positioned by means of the collars 50 and 51 against longitudinal displacement. Bevel gear 49 and the internal lip 34 cooperate to position the whirler head A with respect to the bearing member 32.

Thus, when the whirler head A is rotated, shaft 23 and bevel gear 25 operate to rotate shaft 48. Since cylinder 41, blocks 39 and 38, plate 36 and block 44 are suspended from the supporting structures 8 and 9, through the medium of sleeve 21 and member 45 (and the various other parts hereinbefore described), one would expect that when power is applied to the shaft 48 through shaft 23, the cylinder 41 and its blocks, etc., would revolve. This, however, is not the case because of the fact that the axis of the reel is horizontal and the axis of shaft 23 is at an angle from the horizontal and the member 45 at the other end of the reel is supported or positioned in the parts carried by the structure 8 and because the sleeve 21, which is supported by the ribs 37, carried by the plate 36, extends at an angle to the horizontal. Thus the reel framework comprised of cylinder 41, blocks 39 and 38, plate 36, block 44 and member 45, will remain stationary, in consequence of which certain of the cam operations hereinafter to be described can take place.

Figure 4:
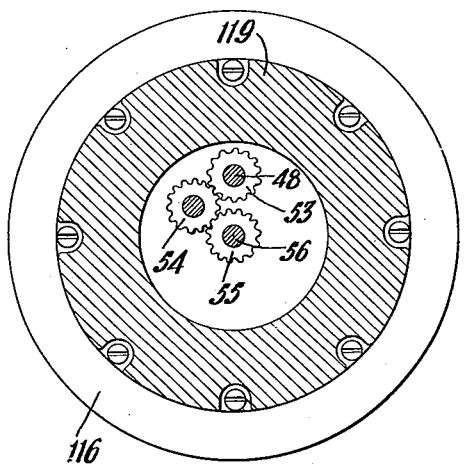
Figure 4 is a section taken on the line C—C of Figure 1—b.

The whirler head B is rotated from shaft 48 as follows, attention being directed to Figures 1—b and Figure 4.

At its left-hand end, shaft 48 is provided with a pinion 53 which meshes with an idler pinion 54 which, in turn, meshes with a pinion 55 mounted on the end of shaft 56 rotatably mounted in member 45. (The shaft of pinion 54 has bearings in block 44 and in member 45.) Bevel gears 25 and 49 are the same size. Shaft 56 rotates with the same R. P. M. as whirler head A and in the same direction.

Keyed to rotate with shaft 56 is a head 57 positioned within the sleeve, this head constituting a part of a clutch. The other member of the clutch is sleeve 58, mounted within sleeve 46 and provided with a dog 59, adapted to establish drive connection between the parts 57 and 58 of the clutch when the dog is pushed home. The sleeve 58 has a pin connection with clutch collar 60, for which purpose sleeve 46 is provided with slots 61. The clutch is shown in disengaged position. Through the operation of the lever mechanism 62, clutch collar 60 may be moved to the right and it, in turn, through its pin connection with member 58, will move the latter toward the right, causing clutching engagement of the dog 59 with the member 57. Mounted within sleeve 46 is a shaft-like portion 63 which is adapted to be connected with and rotate as one with the whirler head B. This whirler head comprises a sleeve-like member 64 mounted on sleeve 46 and carrying whirler tube 12. To cause member 63 to drive the whirler head when the clutch is in, sleeve clutch member 58 is keyed to member 63 and member 63 is connected to the whirler head by means of a tube 65, (which may serve as the key). Since tube 65 passes through sleeve clutch member 58, and since the latter must be capable of movement into and out of clutching position, the sleeve clutch member 58 is provided with a slot 66 through which tube 65 passes.

When the end of the helix reaches the left-hand end of the reel, the free end is picked up, led through whirler tube 12 and out through the opening in member 63, the whirler tube 12 removing yarn, turn for turn, as laid on by whirler tube 11.

Surrounding the cylinder 41 is another cylinder 67 which constitutes the power member of the reel for rotating the rotating parts of the reel. Near its right-hand end, cylinder 67 is positioned with respect to cylinder 41 by the bearing rings 42 hereinbefore described as being carried by block 39. Near its left-hand end it is positioned with respect to cylinder 41 through the medium of a similar bearing ring or bushing 68 carried by cylinder 41.

The manner in which the power cylinder 67 is driven from shaft 48 will now be described, attention being directed to Figure 1—a and Figure 7.

Shaft 48 is provided with a worm 69 which engages a worm gear 70, on the shaft 70' of which there is a bevel gear 71 meshing with a similar bevel gear 72 on shaft 73 mounted in block. Also mounted on shaft 73 is pinion 74 which meshes with an internal ring gear 75 mounted within and secured to cylinder 67. Thus, when shaft 48 is rotated, the cylinder 67 is rotated, the gear train constituting a reduction gearing by means of which the cylinder 67 rotates at a very low rate of speed, as hereinbefore pointed out. (Shaft 70' is supported from cam block 38 by suitable bearing means 70''.)

The means for supporting the sets of bars or slats of the reel and how the bar supports are rotated from the power cylinder 67, will now be described.

Mounted on cylinder 67 toward its right-hand end is a sleeve 76 which, while free to revolve with respect to cylinder 67, normally rotates therewith, but which, as will further appear, at intervals during a revolution, is caused to speed up and slow down with respect to cylinder 67.

A longitudinally extending sleeve 77 has its right-hand end surrounding and supported by sleeve 76. Sleeve 76 and sleeve 77 are keyed together as indicated at 78, said key engaging slot 79 in sleeve 77. At its left-hand end sleeve 77 is supported on a sleeve 80 corresponding to sleeve 76. The set of bars or slats C of the reel are carried on sleeve 77 by the ring-like member 81 near the right-hand end of the reel and by a corresponding ring-like member 82 toward the left-hand end of the reel, the rings 81 and 82 rotating with said sleeve, for which purpose they may be secured thereto in any desired manner.

The other set of bars or slats D are similarly supported on ring-like members 83 and 84, in turn carried upon a sleeve 85 surrounding sleeve 77 and extending from a point near ring 81 to a point near ring 82. Rings 83 and 84 are non-rotatively associated with sleeve 85.

Sleeve 85, however, rotates with sleeve 77, this being brought about by providing pins 86 and 87 which extend into and engage the sides of slots 88 formed in sleeve 77. The slots and pins, while causing sleeves 77 and 85 to rotate together, nevertheless permit relative longitudinal movement as between the two sleeves, as will further appear. By this arrangement sleeves 77 and 85 and the two sets of bars will rotate together, but the bars may have longitudinal or reciprocating movement imparted thereto, by the longitudinal or reciprocating movement of one sleeve with respect to the other sleeve. Longitudinal movement of the sleeves is imparted to the respective bars by reason of the fact that the bars are provided with tongues C', D', which are socketed into the rings 81, 82, 83, 84, as shown in Figures 1—a, 1—b, 8 and 9.

The manner in which sleeve 77 (and with it sleeve 85 which is keyed thereto by the pins 86 and 87) is caused to rotate with power cylinder 67 and to speed up and to slow down with respect thereto, will now be described. This speeding up and slowing down of the sleeves brings about a rocking of the bars, effecting a transfer of the yarn from one set to the other and vice versa, as will appear.

Secured to the right-hand end of cylinder 67 is an external ring member 89 which is welded or otherwise secured thereto. This ring has a rectangular slot 90 (see Figures 1—a and 5). Slidably carried in this slot is the squared shoulder portion 91 of a cam 92 which engages the cam track 93 in cam block 38. Since the ring 89 is secured to the end of power cylinder 67 and rotates therewith, shoulder 91 also rotates with the ring and causes the cam 92 to traverse the cam track, cam block 38 being stationary. The cam device also has an external round head 94 which engages an inclined slot 95 (see Figs. 1—a, 5 and 6) formed in a ring-like member 96 which surrounds ring 89 and has its left-hand end secured to the right-hand end of sleeve 76, as by welding. As will further appear, the cam track 93 has dwell portions during which no movement is imparted to the cam 92 and other portions which cause the cam 92 to move to the right or to the left, longitudinally. Since cam 92 is not shifted longitudinally during the dwell portions, neither is the head 94, and the head 94, in bearing against the side of the inclined slot 95, causes the ring 96 and therefore sleeve 76 to rotate with ring 89 and power cylinder 67, as a unit.

From this it will be seen that normally sleeve 77, and with it sleeve 85, will rotate with and at the same speed as the power cylinder 67. When, however, cam 92 and with it head 94 are shifted longitudinally, to the right or the left as the case may be, the head 94 in bearing against the sides of the inclined slot 95 will temporarily cause ring 96 (and with it sleeves 77 and 85) to rotate relative to power cylinder 67, momentarily speeding up or slowing down, depending upon the direction of shifting of cam 92 by the cam track. At the intervals of speed up, the bars will be rocked in one direction and at intervals of slow down the bars will be rocked in the opposite direction. This rocking brings about a transfer of the yarn from one set to the other set of the bars, as will later appear.

Housing the parts at the right-hand end of the reel, is a ring-like casing member 97 which surrounds ring 96. The left-hand end of this casing is supported and connected to a ring-like member 98 surrounding sleeve 76. At its other end, the casing has an inwardly extending lip or flange 98' which is secured to the flange portions of ring 89 by means of the screws shown in Figure 1—a. These screws also serve to secure an end housing member 99 which serves to carry another housing member 100 which shrouds the gears 25 and 49 and the free end of the double sleeve 22. The joint between parts 99 and 100 is protected by a flexible seal 101. Supported from the member 99 is an annular or ring-like member 102 which shrouds the casing 97 and is provided with arcuate apertures or slots 103 to receive the pins 104 on the ends of the bars C and D. The purpose of these pins is to hold the bars from flying outwardly. The pins are not intended to take any of the inward thrust of the bars.

It will be understood that the housing portions just described rotate with the power cylinder 67.

The means for imparting longitudinal reciprocatory movement to the bars C and D will now be described, reference being had to Figure 1—b. The cam block 44 is provided with a cam track or groove 105.

Fastened to the end of sleeves 77 is a tubular extension piece 106 which carries a cam device 107 having a cam portion 108 engaging the cam track 105. Similarly the sleeve 80 has secured to its end a tubular extension member 109 which has a cam device 110 provided with a cam 111 also engaging cam track or groove 105 and being located 180° opposite cam device 107. The end portions of tubular extensions 106 and 109 are cut back as indicated in dotted lines in the figure, to avoid interference. The pin 87 which holds ring 84 to sleeve 85 and passes through slot 88 in sleeve 77, is secured to the right-hand end of sleeve 80. Thus, while sleeves 80, 77, 85 and ring 84 rotate as one, it is possible to shift sleeve 80 and consequently sleeve 85 longitudinally with respect to sleeve 77. This longitudinal shifting or reciprocation is brought about by the engagement of cam 111 with cam track 105. In this connection, it will of course be understood that the cam device rotates with sleeve 80 and therefore with sleeves 77 and 85. Since sleeve 85 supports the bars of the set D, reciprocatory longitudinal movement is imparted thereto through the medium of cam 111, as just described.

Similarly cam 108, by its engagement with the cam track 105, will bring about longitudinal reciprocatory movement of sleeve 77 which carries the bars of the set C. By reason of this capacity for relative longitudinal reciprocatory movement, when the yarn is being carried and moved to the left by the bars of one set, the other set may be shifted to the right back to starting position.

The cam devices work in slots 112 formed in the sleeve 80' secured to the extreme left-hand end of pilot tube 67. Secured to the end of sleeve 80' is a member 113 to which is secured the housing or shrouding casing 114, the inner end of which is secured to the ring member 115 mounted on the tubular extension 106.

Carried by the casing 114 is an annular ringlike member 116 provided with arcuate apertures or slots 117 to receive the pins 118 on the ends of the bars, these pins serving the same functions as the pins 103 at the other end of the bars. An end shrouding member 119 is secured to member 116 and shrouds the gear train and also the right-hand end of the whirler head.

The power cylinder 67 is preferably made in the form of a cylinder so as to exclude liquids and dirt from the interior. But for this the power cylinder might take any other suitable form. The shrouding devices at both ends of the reel heretofore described also cooperate in the exclusion of liquids, and wherever necessary flexible seals 120 are provided as shown in Figures 1—a and 1—b.

Referring now to Figures 8 and 9, it will be seen that the bars or slats C and D are in the form of flat bars rounded at their inner edges as indicated at 121, where they rest upon their respective ring supports 81 to 84, carried by sleeves 77 and 85. The tongues C' and D' are also rounded as shown at 122, to permit of rocking movement, the sockets 123 into which the tongues project being large enough to permit of this rocking movement. Since ring supports 81—84 rotate with sleeves 77 and 85, and since the latter (rotating as one), at intervals rotate faster and slower than power cylinder 67, the bars will be rocked if a reaction means is provided. This will now be described.

The bars are arranged in pairs, the bars C of one set being immediately adjacent to the bars D of the other set. The adjacent faces of the bars of the pair contact with one another. The housing ring 102 at the right of the reel and the housing ring 116 at the left are each provided with fingers 126 fitting between and bearing against the pairs of bars. Rings 102 and 116 rotate with the power cylinder. Hence at times of speed-up and slow-down of sleeves 77 and 78, the fingers 126 prevent the outer ends of the bars from moving relative to cylinder 67. The inner ends, however, move with sleeves 77 and 85. In Figure 8, the bars are shown in one extreme position of rocking—the position brought about when sleeves 77 and 85 are speeded up with respect to power cylinder 67. In this position, it will be seen that the turns of yarn indicated by the reference letter E are supported by the bars of the set C on the flatted portions 125 thereof. The bars D are out of contact with the yarn, in which position they may be moved longitudinally to starting position.

In Figure 9, the bars are shown in middle or neutral position. In this instance the turns of yarn E are carried by both sets of bars on the flatted portions 125 of the chamfered ends of the bars.

When the bars are rocked to their other extreme positions, i. e., to the opposite side of the middle or neutral position from that shown in Figure 8, bars D will be carrying the yarn and bars C will be out of contact. Rocking movement to that extreme position is brought about by the slow-up of sleeves 77 and 85 with respect to power cylinder 67. In this position bars C, being out of contact, may be longitudinally shifted back to their starting position.

It will be seen from inspection of Figures 8 and 9 that the amount of rocking to either side of the middle position of the bars is very slight, just enough to clear one set of bars from the turns of yarn and permitting the other set of bars to carry the turns.

One might think that there might be a slight alternate loosening and tightening of the turns when shifting from one extreme position of rocking to the middle position and to the other position of rocking. This, however, does not take place.

Referring now to Figure 9, and considering the middle or upright pair of bars, it will be seen that the center of the curved tongue C' is well to one side of the radius which cuts the meeting surfaces of the two bars; whereas in the inclined position of the corresponding bars in Figure 8, the center of tongue C' is almost in the radius. Thus, in Figure 8, the tip of bar C of this pair is farther removed from the center of the reel than is the tip of the bar C of the corresponding pair of Figure 9. The distance is so small that it cannot be well illustrated in the drawings. Nevertheless, it is the fact that the bars project slightly beyond the periphery in which the ends of the bars lie when in neutral position. This distance is sufficiently greater to maintain the perimeter of the turns the same, despite the fact that in Figure 9 the turns are carried on the flatted portions 126 of both sets of bars, whereas in Figure 8 it is carried on the flatted portions of only one set of bars. Thus, there is no alternate tightening or loosening of any given turn and the tension of any given turn remains the same. (It will, of course, be understood that, as is well known in this art, the diameter of the reel may be changed from point to point lengthwise of the reel, to compensate for changes in length of the yarn due to the treatments. Even where this is done, the reel, as stated before, will operate to prevent any given turn from alternately tightening or loosening as the bars are rocked from one position to another.)

It will be noted that the excess of rocking movement is about the tip ends of the bars as a center. Thus the bars do not change point of contact with the turns. To illustrate, when one set of bars has been carrying yarn and is rocked out of engagement with the yarn, when it comes back into engagement with the yarn, then it will pick up again immediately adjacent its companion bar, there being no space between the bars of a pair. Thus it is impossible for capillary action to bring the turns closer together at the points of support and thus the pitch or wind remains the same.

Figure 10:
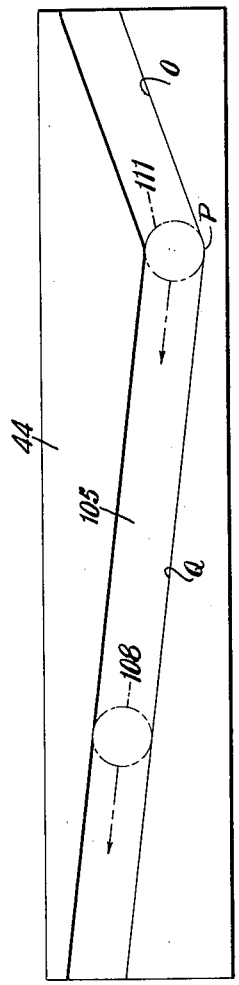
Figure 10 is a developed view of a cam track employed at the left-hand end of the reel.
Figure 11:
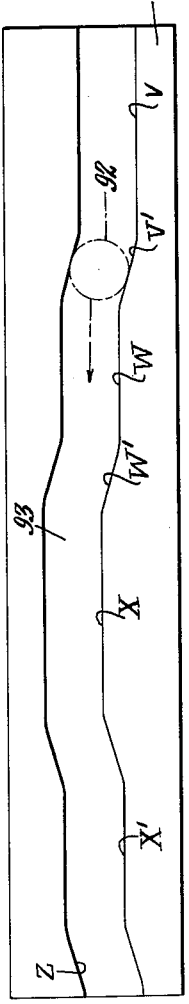
Figure 11 is a developed view of the cam track employed at the right-hand end of the reel.
Figure 12:
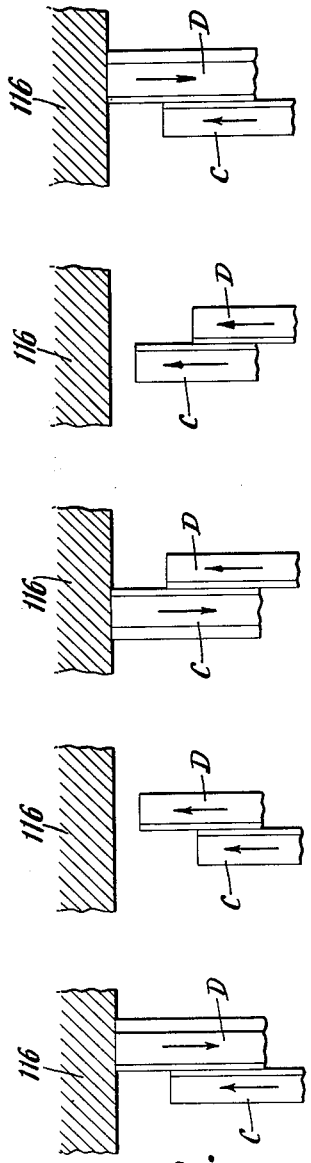
Figure 12 is a series of views to illustrate the action of the cam track of Figure 11 on the bars, in a complete cycle, i. e., one complete revolution.
Figure 13:
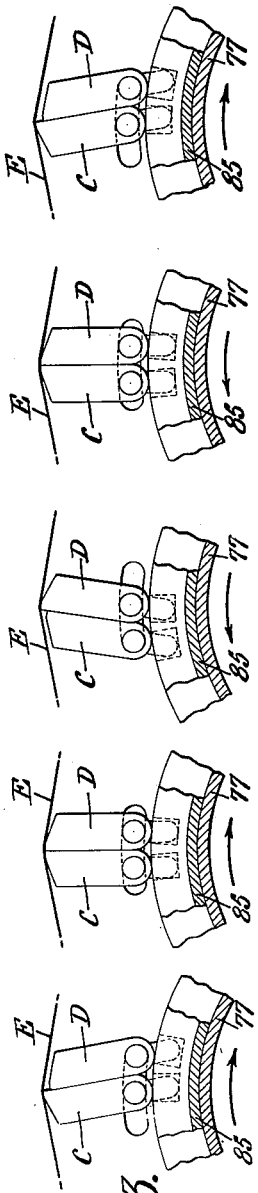
Figure 13 is a series of views illustrating how the yarn is carried by the bars and is transferred from one to the other of the two sets, the position of the parts of this series corresponding to the series of views of Figure 12.

Attention is now directed to Figures 10, 11, 12 and 13. Figures 10 and 11, respectively, are a development of the cam tracks or grooves 105 and 93. Figures 12 and 13 illustrate the position of the respective sets of bars at selected points in one complete revolution or cycle.

It has heretofore been pointed out that when the set of bars C is carrying the yarn and is moving to the left of the reel and the set of bars D is out of contact with the yarn and moving to the right of the reel to starting position, the pairs of bars will have been rocked to one extreme position of rocking movement. In the other extreme position of rocking movement, bars D will be carrying the yarn and moving to the left of the reel and bars C will be out of contact with the yarn and moving to the right to starting position. In being rocked from one extreme position of rocking movement to the opposite extreme of rocking movement, and back again, the pairs of bars must, of course, pass through a neutral or middle position, each time. In the middle or neutral positions, the yarn will be carried by both sets of bars and both sets of bars must be moving in the same direction.

It will be obvious that the bars must remain in each of the two extreme positions of rocking movement and in each of the two neutral or middle positions for a period of time.

The cam tracks are correspondingly laid out. The portion V of cam track 93 represents the dwell period during which the bars are in the position shown in the right-hand view of Figure 13, when bars C are carrying the yarn and are moving toward the left of the reel (upwardly in the corresponding view of Figure 12). The pairs of bars have just been rocked to that position by the portion Z of cam track 93 at the extreme left of Figure 11. (This portion of the cam track brings about a speed-up of sleeves 77 and 85 with respect to cylinder 67, which brings about the rocking of the portions to the position shown in said view.) During this dwell period, bars D are being moved to the right of the reel (downwardly in the corresponding view of Figure 12), this movement being brought about by the cam member 111 riding down the portion O of cam track 105.

At the end of the dwell period, the portion V' of cam track 93 will rock the pairs of bars to the neutral position shown in the second view of Figure 13 from the right. At the instant the bars of the pairs have attained neutral position both bars of each pair will be carrying the yarn and therefore both bars must be moving together in the same direction. By the time cam member 92 has moved through to the end of portion V' of cam track 93, cam 111 will have moved past the point P in cam track 105 and hence bars D will be moving to the left of the reel (upwardly in the corresponding view of Figure 12). In the meantime, cam 108, which is 180° opposite from cam 111, will be moving along the portion Q of cam track 105, and thus bars C and D will be moving together in the same direction at the same speed, during the entire period while the bars of the pair are in a neutral position shown in the second from the right-hand view of Figure 13. The dwell period during which the bars will be in that position is represented by the portion W of cam track 93. Incidentally, at this point it might be noted that the portion V' of track 93 causes a slow-down of sleeves 78 and 85 with respect to cylinder 67, bringing about the rocking of the bars from the position shown in the right-hand view of Figure 13 to the neutral position shown in the second view of Figure 13 from the right, just under consideration.

At the end of the dwell portion W of the cam track 93 is the portion W'. This also is a slow-down portion, slowing sleeves 77 and 85 with respect to cylinder 67. This will rock the bars from the neutral position just described to the position of the middle view of Figure 13, in which view the bars are shown as occupying the other extreme of rocking movement. At this time the bars D are carrying the yarn and bars C are out of contact, bars D moving to the left (upwardly in the corresponding view of Figure 12) and the bars C being moved to the right (downwardly) in the corresponding view of Figure 12. The bars occupy this extreme position of rocking movement during the dwell period represented by the portion X of cam track 93. At the time of entrance into this dwell portion by cam 92, cam 108 will have entered portion O of cam track 105 and bars C will be moving, as described, toward the right to starting position. Cam 111 will still be riding up the slope Q of track 105 and therefore bars D will be moving to the left, as described.

Cam 92 on leaving the dwell portion X and entering the portion X' of cam track 93, will bring about a speed-up of sleeves 77 and 85 with respect to cylinder 67 whereupon the bars will be rocked from the position shown in the middle view of Figure 13 to the neutral position, shown in the fourth view from the right of said figure. At this time, again the yarn will be carried by both sets of bars and both sets of bars must be moving in the same direction, i. e., toward the left of the reel. This will be so because cam block 111 will still be in inclined portion Q of cam track 105, and will be thus moving bars D to the left, and cam 111 will have entered the portion Q, so both sets of bars will be moving in the same direction at the same speed.

This condition will be maintained until cam 92 will have again entered and passed through the portion Z. Thus, the cycle of a revolution is complete and the bars will have been caused to advance the turns laid on by the whirler tube 11 in the form of a helix which will move along the reel to the left or discharge end thereof.

It will be noted from the foregoing that all thrusts on the reel are radially inward to a common center. This is highly advantageous. Where the sets of bars are eccentrically mounted on two different axes, the thrusts will not be radially inward to a common center because the yarn will be carried by half the bars of one set and by half the bars of the other set, and the inward thrust will be on one side of each respective set of eccentric bearings. This is disadvantageous under any circumstances because the inward tension of the yarn upon the reel is very substantial and increases with the denier of the yarn being laid up. Wear and maintenance under such circumstances becomes quite a problem, which I greatly reduce by my construction. Furthermore, in the eccentric type of reel, it is impossible to obtain an effective rigid construction which will not yield under the stresses, which imposes limitation not only on the length of the reel that can be employed but also on the denier of the yarn which can be effectively handled by the reel.

By my invention it is possible to make the reel of very stout rigid construction capable of handling the very heavy tows as well as fine denier yarn. In this connection, it is firstly to be observed that the bars are substantially radially disposed when in yarn carrying position. Hence they do not twist or warp under the tension of the yarn, even under great load. Secondly, the construction is such that the bars can be made of substantial size in cross section. Moreover, the bars are supported on the sleeves at the ends by means of the ring blocks 81—84 hereinbefore described. This leaves annular spaces 127 between the inner edges of the bars and the periphery of the sleeves 77 and 85. The bars may be reinforced by locating additional rings 128 in these spaces, at any desired points lengthwise of the reel (see Fig. 14). These rings are carried by the bars by tongue and socket construction as before described, and are in the nature of internal barrel hoops and are incompressible. It is only necessary to space apart adjacent rings a sufficient distance to permit of the reciprocatory movement of the bars. Thus, a number of rings can be employed. These rings, together with the rings 81, 82, 83 and 84, are alike incompressible and thus great rigidity is obtained and it is possible to provide a rigid structure of relatively great length, as contrasted with the reels now in use in commercial continuous processes. Hence, it is possible to carry out all, or as many as desired, of the treatment operations required in the production of viscose or of cuproammonium rayon yarn, on a single reel. Moreover, all yarn tension or thrust is taken only by the bars and rings, and is not transmitted therethrough inwardly to the driving mechanism. Thus the power requirements are reduced to minimum, and wear and maintenance difficulties also very greatly reduced. There is no alternate tightening and loosening of the turns.

The invention has thus far been described in connection with the treatment of rayon yarns of customary denier where, in order to obtain poundage production, the yarn is laid up rapidly in closely spaced turns.

Figure 15:
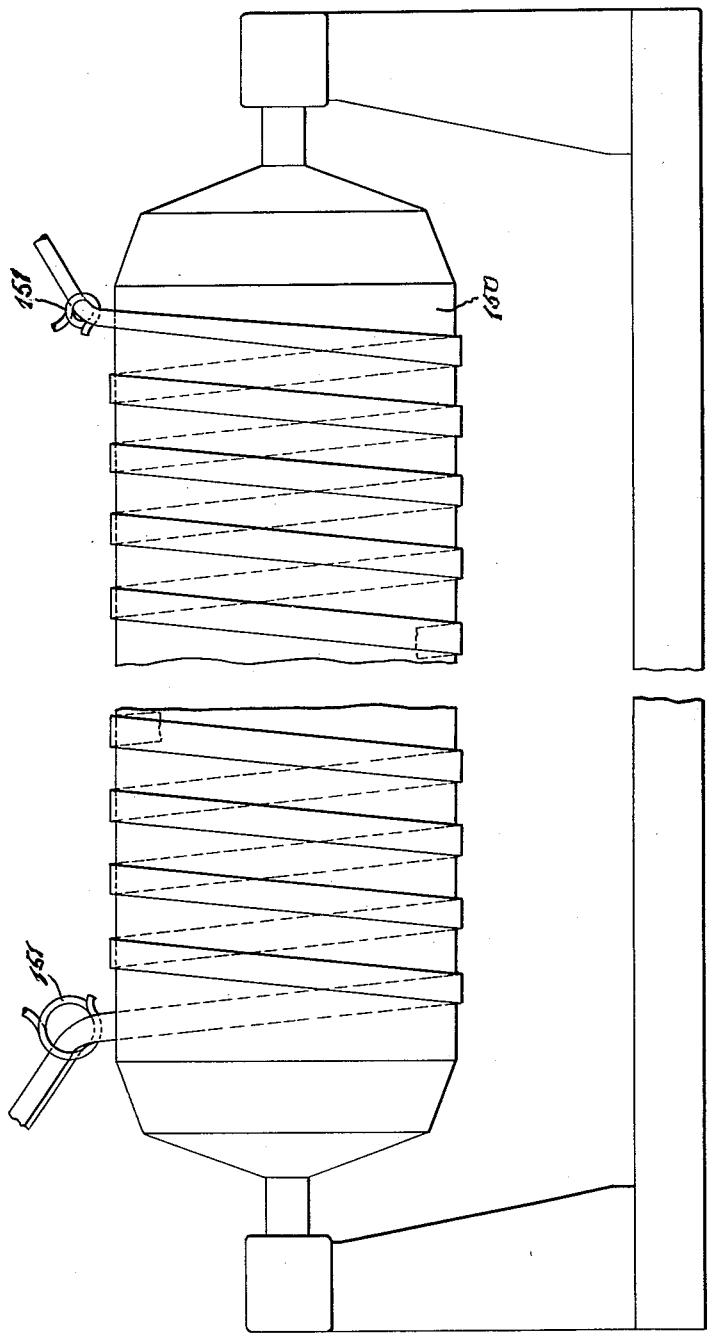
Figure 15 is a diagrammatic view illustrating the use of the reel of my invention in the production of tow.

In the treatment of tow of heavy denier, say, for example, 60,000 denier or more, poundage production can be obtained at low speed operation because of the greatly increased diameter of the yarn. For such use, as shown in Figure 15, a reel 150 of large diameter may be employed, the whirler tubes 11 and 12 being removed, and the tow is wound on to and wound off the reel with the aid of ordinary guide eyes 151 or the like. The reel, in this case, on account of its large diameter, will be turned slowly, and because the tow tends to flatten out in somewhat ribbon-like form, the stroke of the bars is increased to obtain a pitch suitable to lay the tow up in the form of a helix with non-contacting turns. Aside from this, no other essential change in construction is required. In some instances, it might be desirable also to increase the length of the reel, and also the cross-sectional dimensions of the bars to attain greater inherent rigidity in addition to that obtained by the bar supporting rings.

The reel shown is one of a size (7½″ in diameter) and speed suitable for the production of the relatively small denier yarn, say, for example, from around 75 to 150 or 200 denier, or perhaps even heavier. The stroke of the bars for this purpose is ⅜″.

For the handling of tow, it would be desirable to very greatly increase the size and possibly the strength of the parts, as herein just above described. With a very large reel, extremely heavy tows can be effectively treated because of the flattening of the tow into ribbon-like form when on the reel. In such case it would be desirable to apply the treatment liquids on opposite sides of the center line of the reel so as to more effectively subject the yarn to such liquids. In the handling of heavy tows, the reel may well be of four or five feet in diameter and twenty feet long, and the size of the various parts increased for purposes of strength, and means for longitudinally moving the bars, and means for longitudinally moving both sets of bars, and means for longitudinal movement.

Thus it will be seen that the construction is such that it may be effectively used over a wide field, producing commercial poundages with a minimum of reel equipment and a minimum of ancillary equipment. Stated in another way, it is possible to obtain greatly increased capacity at relatively much less cost.

The reel also has many operating advantages. For example, the slow rotation of the reel in a direction opposite to the wind, makes threading or lacing of the take-off whirler very easy. Notwithstanding that the yarn is being laid on at the entrance end at say 100 meters per minute, the free end of the yarn toward the unwinding end, when picked up, is being slowly advanced at three meters per minute to the operator by the opposite rotation of the reel, which permits of easy lacing of the unwinding whirler before it is started up. This also permits of ease of starting up on the twister spool or other take-up device, as, for example, in making a few turns around the bottom of a spool or bobbin for continuous cone winding, etc. and for the tieing of knots when required. This is impossible with rapidly revolving reels. Again, the slanting of the whirler head A, while preventing rotation of the framework of the reel as described, permits of the shedding of liquids from the parts, protecting them without the need of stuffing boxes, which would add to the power requirements.

By rotating the reel frame and not the body of the reel, the bars will advance the yarn in a helix without rotating the same.

Certain features of the invention disclosed but not claimed in the present application are embodied and claimed in my copending application Serial No. 6,694, filed February 6, 1948.

What I claim is:

1. A reel for the treatment of yarns and the like comprising a rotatable body portion, means for supporting the same, two concentric sets of longitudinally extending yarn carrying bars carried on said body portion for rocking movement with respect thereto, the bars of one set alternating with bars of the other set, to provide pairs of adjacent bars, one of a pair belonging to one set and the other of the pair to the other set of bars, and means for rocking said pairs of bars about an axis extending longitudinally thereof whereby in one extreme position of rocking movement the yarn is carried by one set of bars and in the opposite extreme position of rocking movement the yarn is carried by the other set of bars while in the middle position the yarn is carried by both sets of bars, and means for longitudinally reciprocating the bars.

2. A reel for the treatment of yarns and the like comprising a rotatable body portion, means for supporting the same, two concentric sets of longitudinally extending yarn carrying bars carried on said body portion for rocking movement with respect thereto, the bars of one set alternating with bars of the other set, to provide pairs of adjacent bars, one of a pair belonging to one set and the other of the pair to the other set of bars, and means for rocking said pairs of bars about an axis extending longitudinally thereof whereby in one extreme position of rocking movement the yarn is carried by one set of bars and in the opposite extreme position of rocking movement the yarn is carried by the other set of bars while in the middle position the yarn is carried by both sets of bars, and means for longitudinally reciprocating the bars in one direction when in yarn carrying position and in the opposite direction when in non-yarn carrying position.

3. The reel of claim 1 in which the bars are supported at their inner longitudinal edges and the axis of rocking movement of the pairs of bars is approximately at the outer yarn carrying edges of the bars.

4. The reel of claim 1 in which the yarn engaging surfaces of the bars and the extent of rocking movement of the bars are correlated so as to maintain substantially constant the diameter of any turn of yarn on the reel in all positions of the bars.

5. The reel of claim 1 in which the means for rocking said bars includes a member normally rotating with said body portion, and also means for causing said member at intervals during rotation to speed up and to slow down with respect to the rate of rotation of said body portion.

6. The reel of claim 1 in which the rotatable body portion is cylindrical and in which the means for supporting the body portion is a frame within the cylindrical body portion, said frame being supported at its ends.

7. The reel of claim 1 in which the rotatable body portion is cylindrical and in which the means for supporting the body portion is a frame within the cylindrical body portion, said frame being supported at its ends, and in which the means for longitudinally reciprocating the bars comprises coacting cam means, a part of which is carried by said frame and a part by said rotatable cylindrical body portion.

8. The reel of claim 1 in which the rotatable body portion is cylindrical and in which the means for supporting the body portion is a frame within the cylindrical body portion, said frame being supported at its ends, and in which the means for rocking the pairs of bars includes members normally rotating with said cylindrical body portion but having the capacity of being speeded up and slowed down with respect thereto, the reel being provided with means for speeding up and slowing down said members with respect to the body portion.

9. The reel of claim 1 in which the rotatable body portion is cylindrical and in which the means for supporting the body portion is a frame within the cylindrical portion, said frame being supported at its ends, and in which the means for rocking the pairs of bars includes two sleeves one within the other and both surrounding the cylindrical body portion, said sleeves normally rotating with said cylindrical body portion but having the capacity of being speeded up and slowed down with respect thereto as a unit, the reel being provided with means for speeding up and slowing down said sleeves with respect to said cylindrical body portion.

10. The reel of claim 1 in which the rotatable body portion is cylindrical and in which the means for supporting the body portion is a frame within the cylindrical body portion, said frame being supported at its ends, and in which the means for rocking the pairs of bars includes members normally rotating the said cylindrical body portion but having the capacity of being speeded up and slowed down with respect thereto, said frame being provided with means for speeding up and slowing down said members with respect to the body portion.

11. The reel of claim 1 in which the rotatable body portion comprises an inner cylinder, a first sleeve surrounding and carried by said cylinder and a second sleeve surrounding and carried by said first sleeve; and in which the bars of one set are carried by one of said sleeves and the bars of the other set carried by the other of said sleeves, said sleeves normally rotating with said inner cylinder but having the capacity of being speeded up and slowed down with respect thereto, as a unit; and in which the means for supporting the body portion is a frame within said inner cylinder; and in which the means for rocking the pairs of bars comprises cam means, part carried by said frame and part associated with said sleeves, operating to speed up or slow down said sleeves with respect to said inner cylinder.

12. The reel of claim 1 in which the sets of bars are supported from the rotatable body portion at their inner edges, and in which the means for rocking the pairs of bars comprises means engaging the inner edges of the bars and normally rotating with the body portion but having the capacity of being speeded up or slowed down with respect thereto, means for so speeding up and slowing down said means engaging the inner edges of the bars, and means rotating with the body portion and engaging the outer edge portions of the pairs of bars to hold said outer edge portions against movement relative to the rotatable body portion, whereby said bars are caused to rotate about a longitudinal axis approximately at their outer edge portions.

13. The reel of claim 1 in which the sets of bars are supported from the rotatable body portion at their inner edges, and in which the means for rocking the pairs of bars comprises means engaging the inner edges of the bars and normally rotating with the body portion but having the capacity of being speeded up or slowed down with respect thereto, means for so speeding up and slowing down said means engaging the inner edges of the bars, and means rotating with the body portion and engaging the outer edge portions of the pairs of bars to hold said outer edge portions against movement relative to the rotatable body portion, whereby said bars are caused to rotate about a longitudinal axis approximately at their outer edge portions, said last mentioned means comprising a ring-like housing member at each end of the reel rotating with the body portion and having fingers projecting inwardly into the spaces between pairs of bars and engaging said bars to hold the same at said outer edge portions.

14. The reel of claim 1 in which the sets of bars are supported from the rotatable body portion at their inner edges, and in which the means for rocking the pairs of bars comprises means engaging the inner edges of the bars and normally rotating with the body portion but having the capacity of being speeded up or slowed down with respect thereto, means for so speeding up and slowing down said means engaging the inner edges of the bars, and means rotating with the body portion and engaging the outer edge portions of the pairs of bars to hold said outer edge portions against movement relative to the rotatable body portion, whereby said bars are caused to rotate about a longitudinal axis approximately at their outer edge portions, said last mentioned means comprising a ring-like housing member at each end of the reel rotating with the body portion and having fingers projecting inwardly into the spaces between pairs of bars and engaging said bars to hold the same at said outer edge portions and in which the bars, at their ends, have projecting pins, and in which said ring-like housing members are provided with arcuate slots to receive said pins, whereby the bars are prevented from flying outwardly while still having the capacity for said rocking movement.

15. A reel for the treatment of yarns and the like comprising a supporting structure, two concentric sets of longitudinally extending yarn carrying bars carried from said body portion and arranged annularly thereabout for rocking movement with respect thereto, the bars of one set alternating with the bars of the other set to provide pairs of adjacent bars, one of a pair belonging to one set and the other of a pair to the other set of bars, means for rocking said pairs of bars about an axis extending longitudinally of the pairs whereby in one extreme position of rocking movement the yarn is carried by one set of bars and in the opposite position of rocking movement the yarn is carried by the other set of bars while in the middle position the yarn is carried by both sets of bars, means for continuously longitudinally reciprocating the bars in one direction of the reel when in yarn carrying position and in the other direction of the reel when in non-yarn carrying position, rotating means at one end of the reel for laying the yarn on the reel in a turn thereabout, and rotating means at the other end of the reel for taking off the yarn, turn for turn, as laid on.

16. A reel for the treatment of yarns and the like comprising a supporting structure, two concentric sets of longitudinally extending yarn-carrying bars carried from said body portion and arranged annularly thereabout for rocking movement with respect thereto, the bars of one set alternating with the bars of the other set to provide pairs of adjacent bars, one of a pair belonging to one set and the other of a pair to the other set of bars, means for rocking said pairs of bars about an axis extending longitudinally of the pairs where in one extreme position of rocking movement the yarn is carried by one set of bars and in the opposite position of rocking movement the yarn is carried by the other set of bars while in the middle position the yarn is carried by both sets of bars, means for continuously longitudinally reciprocating the bars in one direction of the reel when in yarn carrying position and in the other direction of the reel when in non-yarn carrying position, means at one end of the reel for laying the yarn on the reel in a turn thereabout, and means at the other end of the reel for taking off the yarn, turn for turn, as laid on, together with means for rotating the supporting structure for the bars slowly with reference to the rate at which the turns of yarn are laid on the reel.

17. A reel for the treatment of yarns and the like comprising two spaced end supports, a framework extending therebetween and supported thereby, the axis of support at one end being horizontal and being in the longitudinal axis of the reel and the axis of support at the other end being inclined from the horizontal, a body portion rotatably mounted on said frame, reel bars arranged annularly of said body portion and supported therefrom to rotate therewith and adapted to advance the yarn in the form of a helix along the reel, a shaft mounted in said framework, means rotating about said inclined axis for rotating said shaft, and gearing interposed between said shaft and said body portion for rotating the latter through the medium of said shaft and gearing.

18. A reel for the treatment of yarns and the like comprising two spaced end supports, a framework extending therebetween and supported thereby, the axis of support at one end being horizontal and being in the longitudinal axis of the reel and the axis of support at the other end being inclined from the horizontal, a body portion rotatably mounted on said frame, reel bars arranged annularly of said body portion and supported therefrom to rotate therewith and adapted to advance the yarn in the form of a helix along the reel, a shaft mounted in said framework, means rotating on said inclined axis for rotating said shaft, gearing interposed between said shaft and said body portion for rotating the latter through the medium of said shaft and gearing, a whirler head mounted to rotate about said inclined axis and provided with a whirler tube for laying up the yarn in turns on the reel, and a whirler head at the other end of the reel provided with a whirler tube for removing yarn, turn for turn, as laid up on the reel by said first whirler head and tube.

19. A reel for the treatment of yarns and the like comprising two spaced end supports, a framework extending therebetween and supported thereby, the axis of support at one end being horizontal and being in the longitudinal axis of the reel and the axis of support at the other end being inclined from the horizontal, a body portion rotatably mounted on said frame, reel bars arranged annularly of said body portion and supported therefrom to rotate therewith and adapted to advance the yarn in the form of a helix along the reel, a shaft mounted in said framework, means rotating on said inclined axis for rotating said shaft, gearing interposed between said shaft and said body portion for rotating the latter through the medium of said shaft and gearing, a whirler head mounted to rotate about said inclined axis and provided with a whirler tube for laying up the yarn in turns on the reel, a whirler head at the other end of the reel provided with a whirler tube for removing yarn, turn for turn, as laid up on the reel by said first whirler head and tube, a source of power for driving said first whirler head, and means whereby said first whirler head constitutes a means for driving said shaft.

20. A reel for the treatment of yarns and the like comprising a supporting structure, two sets of concentric rocking bars arranged annularly about said supporting structure mounted equidistant from the axis of the reel and extending longitudinally thereof and constructed and arranged to advance the yarn along said reel in the form of a helix, said bars being supported from said structure at intervals lengthwise of the bars so as to provide space between the inner edges of the bars and the supporting structure at points intermediate the points of support, and internal inflexible barrel hoops supporting the bars located in said space and engaging the inner edges of the bars.

21. A reel for the treatment of yarns and the like comprising a supporting structure, two sets of concentric bars arranged annularly about said supporting structure and extending longitudinally thereof and constructed and arranged to advance the yarn along said reel in the form of a helix, said bars being supported from said structure at intervals lengthwise of the bars so as to provide a space between the inner edges of the bars and the supporting structure at points intermediate the points of support, and internal reinforcing means for the bars located in said space, said reinforcing means being substantially in the form of internal barrel hoops or rings.

22. A reel for the treatment of yarns and the like comprising a supporting structure, two sets of concentric bars arranged annularly about said supporting structure and extending longitudinally thereof and constructed and arranged to advance the yarn along said reel in the form of a helix, said bars being supported from said structure at intervals lengthwise of the bars so as to provide space between the inner edges of the bars and the supporting structure at points intermediate the points of support, and internal reinforcing means for the bars located in said space, said reinforcing means being substantially in the form of internal barrel hoops or rings, said reel having means for longitudinally reciprocating said bars and said barrel hoops being spaced apart at least a distance sufficient to permit of such reciprocating movement.

23. A reel for the treatment of yarns and the like comprising a supporting structure, two sets of concentric bars arranged annularly about said supporting structure and extending longitudinally thereof and constructed and arranged to advance the yarn along said reel in the form of a helix, said bars being supported from said structure at intervals lengthwise of the bars so as to provide space between the inner edges of the bars and the supporting structure at points intermediate the points of support, spaced ring-like members carried by said supporting structure affording said support for the bars, and a plurality of reinforcing ring-like members for the bars arranged at spaced intervals lengthwise of the reel in said space, all of said rings engaging inner edge portions of the bars.

24. A reel for the treatment of yarns and the like comprising a supporting structure, two sets of concentric bars arranged annularly about said supporting structure and extending longitudinally thereof and constructed and arranged to advance the yarn along said reel in the form of a helix, said bars being supported from said structure at intervals lengthwise of the bars so as to provide a space between the inner edges of the bars and the supporting structure at points intermediate the points of support, spaced rings carried by said supporting structure affording said support for the bars, and a plurality of reinforcing rings for the bars arranged at spaced intervals lengthwise of the reel, all of said rings engaging inner edge portions of alternate sets of the bars, said reel being provided with means for reciprocating the bars longitudinally thereof and all of said rings being spaced from one another a distance at least sufficient to permit of the reciprocatory movement.

25. A reel for the treatment of yarns and the like comprising two spaced end supports, a supporting structure extending therebetween and comprising a non-rotating frame, a rotating tubular member around said frame, means for rotating said tubular member, a first sleeve surrounding said tubular member and mounted for rotation therewith, a second sleeve surrounding said first sleeve and mounted for rotation therewith, two sets of concentric yarn carrying bars, one set being supported from said first sleeve and the other set being supported by said second sleeve, the bars being arranged in pairs annularly of the sleeves, one bar of a pair belonging to one set and the other bar of a pair belonging to the other set, means for rocking said pairs of bars about a longitudinal axis whereby in one extreme position of rocking movement the yarn is carried by one set of bars and in the other extreme of rocking movement the yarn is carried by the other set of bars and the yarn is carried by both sets of bars in the middle position, and means for reciprocating said bars in one direction longitudinally of the reel when in yarn carrying position and in the other direction when in non-yarn carrying position, said means comprising elements operatively associated with said frame and with said respective sleeves whereby reciprocatory movement is imparted to the sleeves and through them to the bars.

26. A reel for the treatment of yarns and the like comprising two spaced end supports, a supporting structure extending therebetween and comprising a non-rotating frame, a rotating tubular member around said frame, means for rotating said tubular member, a first sleeve surrounding said tubular member and mounted for rotation therewith, a second sleeve surrounding said first sleeve and mounted for rotation therewith, two sets of concentric yarn carrying bars, one set being supported from said first sleeve and the other set being supported by said second sleeve, the bars being arranged in pairs annularly of the sleeves, one bar of a pair belonging to one set and the other bar of a pair belonging to the other set, means for rocking said pairs of bars about a longitudinal axis whereby in one extreme position of rocking movement the yarn is carried by one set of bars and in the other extreme of rocking movement the yarn is carried by the other set of bars and the yarn is carried by both sets of bars in the middle position, and means for reciprocating said bars in one direction longitudinally of the reel when in yarn carrying position and in the other direction when in non-yarn carrying position, said last means comprising a cam track on said frame, a cam operating in said cam groove and connected with one of said sleeves, and a second cam operating in said cam groove and connected to the other of said sleeves, whereby reciprocatory movement is imparted to the sleeves and through them to the bars.

27. A reel for the treatment of yarns and the like comprising two spaced end supports, a supporting structure extending therebetween and comprising a non-rotating frame, a rotating tubular member around said frame, means for rotating said tubular member, a first sleeve surrounding said tubular member and mounted for rotation therewith, a second sleeve surrounding said first sleeve and mounted for rotation therewith, two sets of concentric yarn carrying bars, one set being supported from said first sleeve and the other set being supported from said second sleeve, the bars being arranged in pairs annularly of the sleeves, one bar of a pair belonging to one set and the other bar of a pair belonging to the other set, and means for speeding up and slowing down said sleeves with respect to said tubular member comprising a cam track on said frame, a cam member associated with said tubular member for rotation therewith and having a head engaging said cam track, a bushing-like member rotatably associated with said sleeves and mounted for normally rotating with respect to said tubular member, said bushing having an inclined slot and said cam member having a head engaging said inclined slot, said cam member being mounted for longitudinal shifting movement with respect to said tubular member, whereby when the cam is shifted longitudinally the co-action with said inclined slot causes the bushing and with it the sleeves to speed up or slow down with respect to the tubular member, depending upon the direction of shifting of the cam member.

28. A reel for the treatment of yarn and the like comprising a supporting structure, two sets of longitudinally extending bars arranged thereabout and adapted to advance the yarn along the reel in the form of a helix, and means for laying the yarn around the reel comprising a whirler head, said whirler head being mounted on an axis extending at an angle with respect to the longitudinal axis of the reel, a support for said whirler head, an arcuate or gooseneck member swiveled in said support for rotation on an axis coinciding with the longitudinal axis of the reel, a correspondingly arcuate sleeve member on the whirler head in which the arcuate portion of the gooseneck is mounted for relative sliding movement, the radii on which said arcuate portions are struck having their center in the longitudinal axis of the reel, said arcuate or gooseneck member being provided with a whirler tube, whereby when said whirler head is rotated about its axis the gooseneck member is rotated about its axis and the whirler tube rotated about the reel and the free end of the whirler tube always rotates in a plane at right angles to the longitudinal axis of the reel, and a whirler head at the other end of the reel provided with a whirler tube for removing yarn from the reel, turn for turn, as laid on by the first whirler head.

29. The reel of claim 1 in which the bars of each pair are immediately side by side with no substantial space therebetween.

30. A reel for the treatment of yarns and the like comprising a reel portion proper for carrying the yarn in the form of an advancing helix, a whirler head and its whirler tube for winding the yarn on one end of the reel proper, means for rotating said head at relatively high speed, means for rotating the reel proper in the opposite direction at very low relative speed, an unwinding whirler head and its tube at the other end of the reel proper, common driving means for the whirler heads, and a clutch for connecting and disconnecting said unwinding whirler head with said driving means.

31. A reel for the treatment of yarns and the like, comprising in combination a supported body portion and its driving mechanism, two concentric sets of longitudinally extending yarn carrying rocking bars arranged around said body portion and mounted equidistant from the axis of the reel and being of the type which advances the yarn in a helix along the reel, and inflexible internal barrel hoops arranged between the body portion and the inner portions of the bars and supporting the latter, whereby the tension of the yarn on the bars is taken by the bars and barrel hoops and not transmitted to the body portion and driving mechanism.

32. The reel of claim 1 in which filler members are located in the spaces between adjacent pairs of bars, which members cooperate with the bars to provide a substantially continuous peripheral surface for the reel.

WILLIAM H. FURNESS.

REFERENCES CITED

The following references are of record in the file of this patent:

UNITED STATES PATENTS

| Number | Name | Date |
| --- | --- | --- |
| 1,983,221 | Furness | Dec. 4, 1934 |
| 2,002,994 | Hartmann | May 28, 1935 |
| 2,155,324 | Moritz | Apr. 18, 1939 |
| 2,168,555 | Battin | Aug. 8, 1939 |
| 2,210,913 | Knebusch | Aug. 13, 1940 |
| 2,260,565 | Furness | Oct. 28, 1941 |
| 2,287,517 | Ewing | June 23, 1942 |
| 2,294,902 | Gram | Sept. 8, 1942 |
| 2,384,963 | Pollak | Sept. 18, 1945 |